(12) United States Patent
Vairavakkalai et al.

(10) Patent No.: US 11,070,469 B1
(45) Date of Patent: Jul. 20, 2021

(54) SCALING BORDER GATEWAY PROTOCOL SERVICES

(71) Applicant: Juniper Networks, Inc, Sunnyvale, CA (US)

(72) Inventors: Kaliraj Vairavakkalai, Fremont, CA (US); Jonathan C. Barth, Collegeville, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 38 days.

(21) Appl. No.: 16/725,872

(22) Filed: Dec. 23, 2019

Related U.S. Application Data

(60) Provisional application No. 62/898,698, filed on Sep. 11, 2019.

(51) Int. Cl.
*H04L 12/781* (2013.01)
*H04L 29/08* (2006.01)
*H04L 29/12* (2006.01)
*H04L 12/741* (2013.01)
*H04L 12/707* (2013.01)

(52) U.S. Cl.
CPC .............. *H04L 45/52* (2013.01); *H04L 45/24* (2013.01); *H04L 45/745* (2013.01); *H04L 61/2571* (2013.01); *H04L 67/1074* (2013.01)

(58) Field of Classification Search
None
See application file for complete search history.

(56) References Cited

U.S. PATENT DOCUMENTS

| 2007/0019540 A1* | 1/2007 | Biswas | H04L 29/12094 370/217 |
| 2009/0168788 A1* | 7/2009 | Den | H04L 61/2514 370/401 |
| 2014/0195666 A1* | 7/2014 | Dumitriu | H04L 49/70 709/223 |

(Continued)

OTHER PUBLICATIONS

Barth et al., "LINX103: Scale Out Route-Server," Juniper Networks, Nov. 14, 2018, 22 pp.

(Continued)

*Primary Examiner* — Yaotang Wang
(74) *Attorney, Agent, or Firm* — Shumaker & Sieffert, P.A.

(57) ABSTRACT

This disclosure describes techniques for scaling resources that handle, participate, and/or control routing protocol sessions. In one example, this disclosure describes a method that includes instantiating a plurality of containerized routing protocol modules, each capable of storing routing information about a network having a plurality of routers; performing network address translation to enable each of the containerized routing protocol modules to communicate with each of the plurality of routers using a public address associated with the computing system; configuring each of the containerized routing protocol modules to peer with a different subset of the plurality of routers so that each of the containerized routing protocol modules share routing information with a respective different subset of the plurality of routers; and configuring each of the containerized routing protocol modules to peer with each other to share routing information received from the different subsets of the plurality of routers.

20 Claims, 4 Drawing Sheets

(56) References Cited

U.S. PATENT DOCUMENTS

2014/0310418 A1* 10/2014 Sorenson, III ...... H04L 67/1002
709/226
2018/0006935 A1* 1/2018 Mutnuru ................. H04L 45/42

OTHER PUBLICATIONS

"Cloud Native Route Server," Japan Network Operators' Group; JANOG43 Meeting, Jan. 23-25, 2019, 21 pgs. (Paritial English Translation).
"OCPSummit19—EW: SONiC—cRPD—Cloud Grade Routing as a Micro Service for Open Networking Platform," Open Compute Project, Mar. 17, 2019, Retrieved from: https://www.youtube.com/watch?v=VYyLYr0rNg0, Accessed date Apr. 22, 2020, 3 pp.

* cited by examiner

SCALING BORDER GATEWAY PROTOCOL SERVICES

CROSS REFERENCE

This application claims the benefit of U.S. Provisional Patent Application No. 62/898,698 filed on Sep. 11, 2019, which is hereby incorporated by reference herein in its entirety.

TECHNICAL FIELD

This disclosure generally relates to computer networks and, more specifically, to network routing protocol sessions.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, maintain routing information that describes routes for the network. In general, a route indicates reachability information for a network prefix. From the routing information, the routers may generate forwarding information, which is used by the routers to relay packet flows through the network and, more particularly, to relay the packet flows to a next hop. In reference to forwarding a packet, the "next hop" from a network router typically refers to a downstream neighboring device for a given route. Upon receiving an incoming packet, the router examines information within the packet to identify the destination for the packet. Based on the destination, the router forwards the packet in accordance with the forwarding information.

Some computer networks, such as the Internet, include many routers that exchange routing information according to a defined routing protocol, such as Border Gateway Protocol ("BGP"). When two routers initially connect, the routers exchange routing information and generate forwarding information from the exchanged routing information. Particularly, the two routers initiate a routing protocol communication "session" during which they exchange routing information using routing protocol messages according to the defined routing protocol. The routers continue to communicate via the routing protocol session to incrementally update the routing information and, in turn, update their forwarding information in accordance with changes to a topology of the network indicated in the updated routing information. For example, the routers may send update messages to advertise newly available routes or to inform that some routes are no longer available.

A computer network using a routing protocol, such as BGP, for example, directs data packets between network nodes based on addressing information within the data packets. A route advertisement message, such as a BGP UPDATE message, advertises one or more routes for network prefixes reachable via the network. A routing domain, such as a BGP network, may include one or more routers, route reflectors, nodes, and endpoint devices (e.g., servers, printers, and computers). Some of the routers within the routing domain may be grouped together into redundant clusters. Each router within the routing domain typically forwards packets according to routes stored at the router and the destination address of the data packets.

SUMMARY

This disclosure describes techniques for scaling resources that handle, participate, and/or control routing protocol sessions. In some examples, the techniques described pertain to BGP protocol sessions involving autonomous systems in which a BGP route server or a BGP route reflector is employed. To implement the functionality of the route server or route reflector, a compute node executing a plurality of containerized routing protocol modules may be used, where the containerized routing protocol modules implement the functionality of the route server or route reflector. In some examples, each of the containerized routing protocol modules participates in BGP peering sessions with other BGP speakers, such as BGP neighbors within an autonomous system or BGP neighbors within other autonomous systems. Such BGP neighbors are referred to as clients of the BGP service provided by the route server or route reflector. Where additional capacity is needed to handle BGP services for peering with additional BGP neighbors, one or more additional containerized routing protocol modules can be instantiated on the compute node. Further, workload among multiple containerized routing protocol modules can be allocated and reallocated to efficiently accommodate changes in activity or demands of various BGP neighbors.

In addition to the above advantages, the techniques may enable peering by the BGP clients to a single compute device while still permitting distribution of the BGP workload among multiple containerized routing protocol modules. That is, rather than scaling up using a hardware cluster of multiple compute devices, which would require either a dedicated load balancer or separate network interfaces for different groups of BGP clients assigned to respective compute devices, the techniques may allow a single compute device to distribute BGP services for different BGP clients, different address families, or according to other dimensionalities, among multiple containerized routing protocol modules all associated with the same external network address used as the peering address for the BGP clients. This may in some cases have the further advantage of reducing operation burdens for configuring the BGP clients with different external network addresses for multiple different compute devices, and may otherwise allow for scale out without modifications to the BGP clients. Moreover, in some cases, having all of the multiple containerized routing protocol modules operate on a single compute node can enable each of the containerized routing protocol modules to share a single data store to store routes for the BGP services.

In some examples, this disclosure describes routing protocol sessions performed by a computing system, compute node, a network router or other network device in accordance with one or more aspects of this disclosure. In one specific example, this disclosure describes a method that includes instantiating a plurality of containerized routing protocol modules, each capable of storing routing information about a network having a plurality of routers; performing network address translation to enable each of the containerized routing protocol modules to communicate with each of the plurality of routers using a public address associated with the computing system; configuring each of the containerized routing protocol modules to peer with a different subset of the plurality of routers so that each of the containerized routing protocol modules share routing information with a respective different subset of the plurality of routers; and configuring each of the containerized routing protocol modules to peer with each other to share routing information received from the different subsets of the plurality of routers.

In another example, this disclosure describes a system comprising a storage system and processing circuitry having access to the storage system and configured to: instantiate a plurality of containerized routing protocol modules, including a first module and a second module, each capable of storing routing information about a network having a plurality of routers, perform network address translation to enable each of the first module and the second module to communicate with any of the plurality of routers using a public address associated with the computing system, configure the first module to use the public address to peer with a first subset of the plurality of routers; configure the second module to use the public address to peer with a second subset of the plurality of routers, wherein the second subset is different than the first subset; configure the first module to peer with the second module to share routing information received from the first subset of the plurality of routers, and configure the second module to peer with the first module to share routing information received from the second subset of the plurality of routers.

In yet another example, this disclosure describes a computer-readable storage medium comprising instructions that, when executed, configure processing circuitry of a computing system to perform operations comprising instantiating, by a computing system, a plurality of containerized routing protocol modules, each capable of storing routing information about a network having a plurality of routers; performing, by the computing system, network address translation to enable each of the containerized routing protocol modules to communicate with any of the plurality of routers using a public address associated with the computing system; and configuring, by the computing system, each of the containerized routing protocol modules to: communicate, using the public address, with a subset of the plurality of routers to peer with the subset of the plurality of routers so that each of the plurality of containerized routing protocol modules share routing information with a different subset of the plurality of routers, store routing information in a shared data store accessible to each of the plurality of containerized routing protocol modules, and share, through the shared data store and with at least one other of the plurality of containerized routing protocol modules, routing information.

DETAILED DESCRIPTION

This disclosure relates to implementing a routing protocol service system that can be effectively scaled to provide routing protocol services, such as Border Gateway Protocol route reflector or Border Gateway Protocol route server services. In some examples, the routing protocol service system is implemented using a containerization platform, with multiple containers each independently executing a routing protocol daemon ("RPD"). Each routing protocol daemon may be spawned behind a single routing protocol service using network address translation ("NAT"). In some examples, a routing protocol service system as described herein can be effectively and/or efficiently scaled yet can be implemented without changes to BGP and without software changes to existing client BGP nodes.

In some examples, containerized RPD modules are instantiated, and each is assigned a subset of BGP clients, meaning each RPD module serves only a subset of the BGP clients for a system, and may therefore receive only a subset of the routes advertised by the clients. Accordingly, each containerized RPD module may peer full-mesh with each of the other containerized RPD modules serving a cluster or system to share routing information, and each RPD module may maintain its own data store of routing information. Although this may help in situations where a management daemon instance cannot read the generated configuration, it may also increase the RIB (routing information base) scale on each RPD module in implementations.

In some examples, the redundancy of routes in each of the RIBs included in each RPD module can be reduced or eliminated with a shared data store collectively maintained by all of the RPD modules. Each of the RPD modules accesses routes received by any of the RPD modules by accessing the shared data store.

Figure 1A:
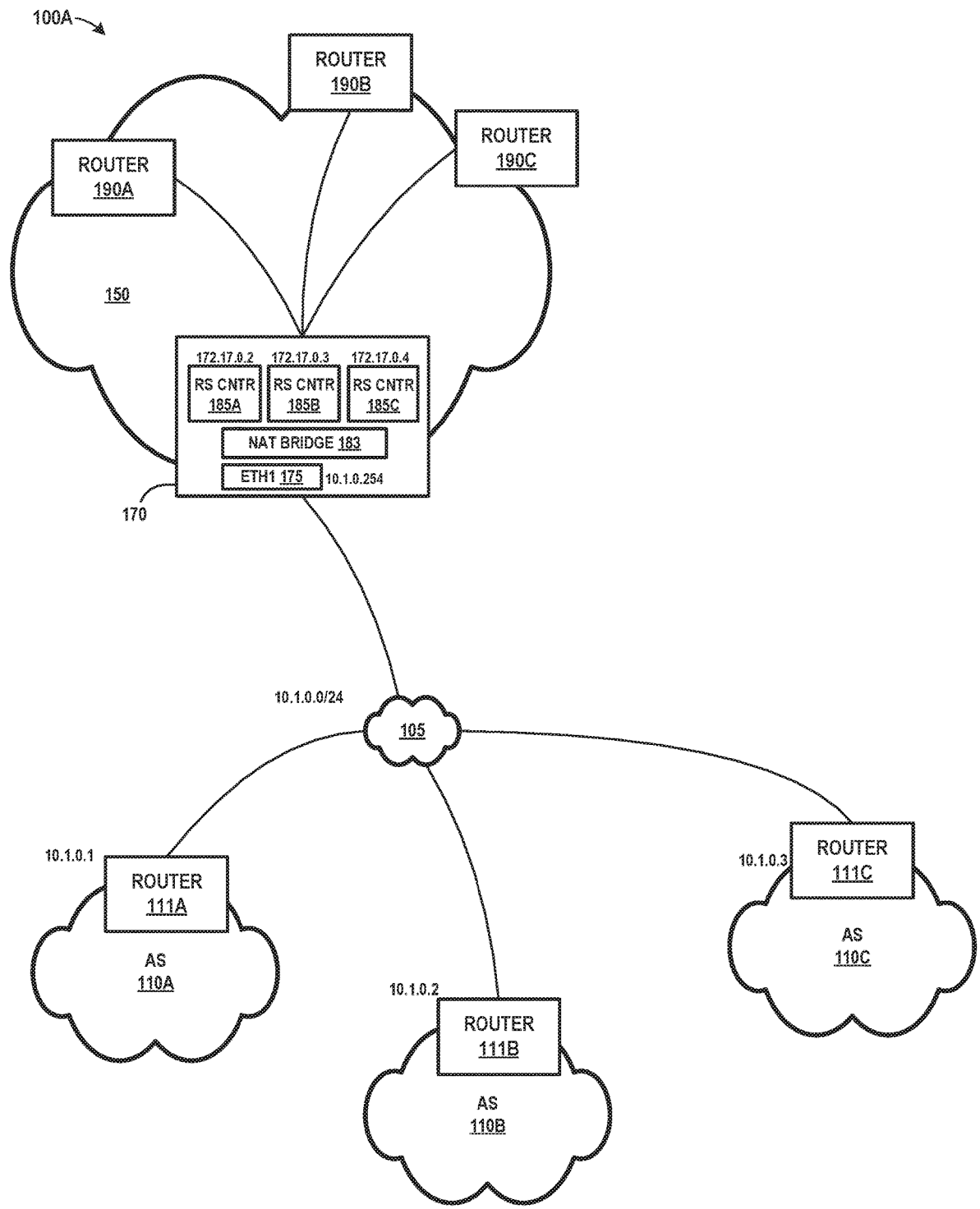
FIG. 1A is a block diagram illustrating an example system in which a route server is configured to share routing information with a plurality of devices within a network.

FIG. 1A is a block diagram illustrating an example system in which a route server is configured to share routing information with a plurality of devices within a network. FIG. 1A includes system 100A including network 105 connecting autonomous systems 110A, 110B, and 110C (collectively "autonomous systems 110") and network 150. Network 150 includes a routing protocol service system, such as route server 170. Typically, a route server, such as route server 170, simplifies external BGP peering at traditional internet exchange points. Instead of maintaining individual, direct eBGP peerings with every other provider, an internet exchange client (e.g., any of autonomous systems 110 or any of border routers 111A, 111B, or 111C) might maintain only a single connection to the route server (e.g., route server 170) operated by the internet exchange.

Network 150 also includes other network devices, routers, compute nodes, and/or other devices, including routers 190A, 190B, and router 190C (collectively "routers 190," representing any number of routers). Route server 170 includes ethernet interface 175, NATed bridge 183, and route server containers 185A, 185B, and 185C (collectively "route server containers 185," representing any number of route server containers). Each of autonomous systems 110 include one or more network devices, routers, compute nodes, and/or other devices. As shown in FIG. 1A, border routers 111A, 111B, and 111C (collectively "border routers 111") are included within each of autonomous systems 110.

Network 105 may be the internet, or may include or represent any public or private communications network or other network. For instance, network 105 may be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 105 using any suitable communication techniques. Network 105 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 2 may be operatively coupled to network 105 using one or more network links. The links coupling such devices or systems to network 105 may be Ethernet, Asynchronous Transfer Mode (ATM) or other types of network connections, and such connections may be wireless and/or wired connections. One or more of the devices or systems illustrated in FIG. 2 or otherwise on network 105 may be in a remote location relative to one or more other illustrated devices or systems.

Each of autonomous systems 110 may execute one or more interior gateway protocols (IGPs), such as Open Shortest Path First (OSPF), Routing Information Protocol (RIP), Intermediate System-to-Intermediate System (IS-IS), Interior Gateway Routing Protocol (IGRP), Enhanced IGRP (EIGRP), and Interior Border Gateway Protocol (iBGP), and each of autonomous systems 110 may include includes a set of one or more routers (e.g., border routers 111) operating within a single administrative domain according to a routing policy. Autonomous systems 110 may each have an identification number provided by an Internet registry or by an Internet service provider (ISP) that uniquely identifies the autonomous system to other autonomous systems. In some instances, the identification number may be drawn from a private identifier number space and therefore unique only within a private network comprising autonomous systems 110. In various examples, each of autonomous systems 110 may represent a service provider network, an enterprise or campus network, a content access network (CAN), or a content delivery network (CDN), for example. In addition, one or more service providers, content provider, or enterprise/campus network administrators may administer any one or more of autonomous systems 110.

Routers included within autonomous systems 110 may implement a routing protocol to route packets from source network addresses to destination network addresses, and each of autonomous systems 110 may offer network packet delivery to a network (or subnet) of one or more endpoints identified by a network address prefix that encompasses the network address range defined by the network addresses of endpoints. Although the techniques of this disclosure may be applied with respect to multiple different routing protocols, the techniques are generally described hereinafter with respect to BGP.

Network 150 may also be an autonomous system, implemented in a manner similar to any of autonomous systems 110. Routers 190 included within network 150 also implement a routing protocol to route packets from source network addresses to destination network addresses. Route server 170 may operate to translate network addresses used within network 150 to addresses used external to network 150. For example, in FIG. 1A, NATed bridge 183 may translate public addresses on network 105 to private addresses used on network 150. In the example illustrated, route server 170 has a public address of 10.1.0.254, and incoming network data units at route server 170 that use the 10.1.0.254 address are translated into one of the private addresses used by route server containers 185A, 185C, or 185C (172.17.0.2, 172.17.0.3, or 172.17.0.4, respectively). Similarly, NATed bridge 183 translates the private addresses used by route server containers 185 into the public address (10.1.0.254).

Network 105 connects route server 170 and routers 190 of network 150 to each of border routers 111A, 111B, and 111C within autonomous systems 110. In FIG. 1A, border routers 111 within each of autonomous systems 110 and routers 190 may peer with each other using BGP protocol to share routing information, enabling each of routers 190 and border routers 111 to learn routes, and thereby enabling access to external systems. In some implementations, all of the nodes in a system implementing BGP are fully interconnected, which would normally require many connections if the number of BGP nodes (autonomous systems 110 and routers 190) is large. As a result, BGP does not tend to scale well.

In the example of FIG. 1A, and to improve scalability, each of routers 190 in network 150 are gathered together in a cluster where route server 170 serves an external representative on network 105. In such an example, route server 170 receives and/or stores all incoming route information and forwards it to each of routers 190. Internally generated routes (e.g., those generated by routers 190) are also forwarded to route server 170, and route server 170 forwards such routes to all peers (e.g., border routers 111 within autonomous systems 110) outside network 150. In some examples, route server 170 may simply serve as a pass-through for incoming and outgoing routes, without filtering or processing.

When route server 170 is deployed within network 150, each of autonomous systems 110 only need to connect to route server 170 on network 150, rather than with each of routers 190 within network 150. Similarly, rather than requiring each of routers 190 to establish a separate connection to each of autonomous systems 110 on network 105, each of routers 190 within network 150 only need to communicate with route server 170 to share routes or routing information with autonomous systems 110. A configuration that uses route server 170 in the manner illustrated in FIG. 1A may therefore significantly reduce the number of connections needed to enable BGP peering among routers 190 and autonomous systems 110.

In FIG. 1A, route server 170 operates by executing one or more route server containers 185, each of which acts as a separate routing protocol stack instance implementing route server functionality. In some examples, each of route server containers 185 may be implemented as a separate routing protocol daemon (RPD). In some examples, each of route server containers 185 acts independently, such that each of route server containers 185 has its own routing information base (RIB). Further, in some examples, each of route server containers 185 may also share routing information through internal BGP sessions with each of the other route server containers 185. Each of route server containers 185 may be assigned to a subset of border routers 111, so that each route server container peers with only some of border routers 111. In such an example, each of route server containers 185 will learn routes only from those border routers 111 with which it is peering, so to learn about other routes received by other route server containers 185, route server containers 185 may also peer with each other to exchange routing information.

In some examples, some route server containers 185 may peer with BGP clients for routing information associated with specific address families, while other route server containers 185 may peer with BGP clients for routing information associated with other address families. In such an example, such route server containers 185 might not need to peer with each other to the extent that such route server containers 185 do not maintain routing information for overlapping address families. In other words, if route server container 185A peers only with autonomous systems 110 for routing information for a first address family (e.g., Layer 3 VPN address families), and route server container 185B peers with other autonomous systems 110 for routing information for a different address family (e.g., IP v4 address families), it might not be necessary for route server container 185A and route server container 185B to peer to each other to the extent that those address families do not overlap. Accordingly, associating each of route server containers 185 with separate address families, to the extent possible, might reduce or eliminate the need for each of route server containers 185 to peer with one another through internal BGP sessions.

In accordance with one or more aspects of the present disclosure, RPD modules 286 may collectively implement a route server. For instance, in an example that can be described in the context of FIG. 1A, route server 170 instantiates each of route server containers 185 and each executes functionality similar to or corresponding to functionality of a route server in a BGP environment. In one example, route server container 185A may peer with one or more of border routers 111 (e.g., border router 111A and border router 111B), and route server container 185B may peer with a different subset of border routers 111 (e.g., border router 111C). Each of route server containers 185 may exchange routing information with its peering neighbors within autonomous systems 110, and thereby learn routing information.

To enable communications between route server containers 185 and border routers 111, NATed bridge 183 may perform network address translation. For instance, NATed bridge 183 may translate destination addresses in network packets received by route server 170 over network 105 into destination addresses associated with the appropriate route server container 185. Similarly, when transmitting outgoing network packets over network 105, NATed bridge 183 may translate source addresses associated with route server containers 185 into a public source address associated with route server 170.

In some examples, each of route server containers 185 may peer with each other. For instance, in the example of FIG. 1A, route server container 185A may establish BGP routing sessions with each of route server container 185B and route server container 185C. Similarly, route server container 185B may establish a BGP routing session with route server container 185C. By peering with each other, route server containers 185 can share routing information that any of route server containers 185 learns from border routers 111.

To scale route server 170, route server 170 may instantiate one or more new route server containers 185. For instance, if a new autonomous system is added to system 100A, route server 170 may instantiate a new route server container 185 (e.g., route server container 185D, not shown) to accommodate or implement a BGP peering relationship with one or more routers within the new autonomous system. Similarly, if an existing autonomous system 110 is communicating a significant amount of routes during BPG peering sessions, route server 170 may reallocate which route server containers 185 peer with which autonomous systems 110. In some examples, such reallocation may include instantiating a new route server container 185. Scaling route server 170 by instantiating one or more new route server containers 185 may, in some examples, be performed without affecting or modifying any of border routers 111 or any existing peering relationships route server 170 may have with border routers 111.

Figure 1B:
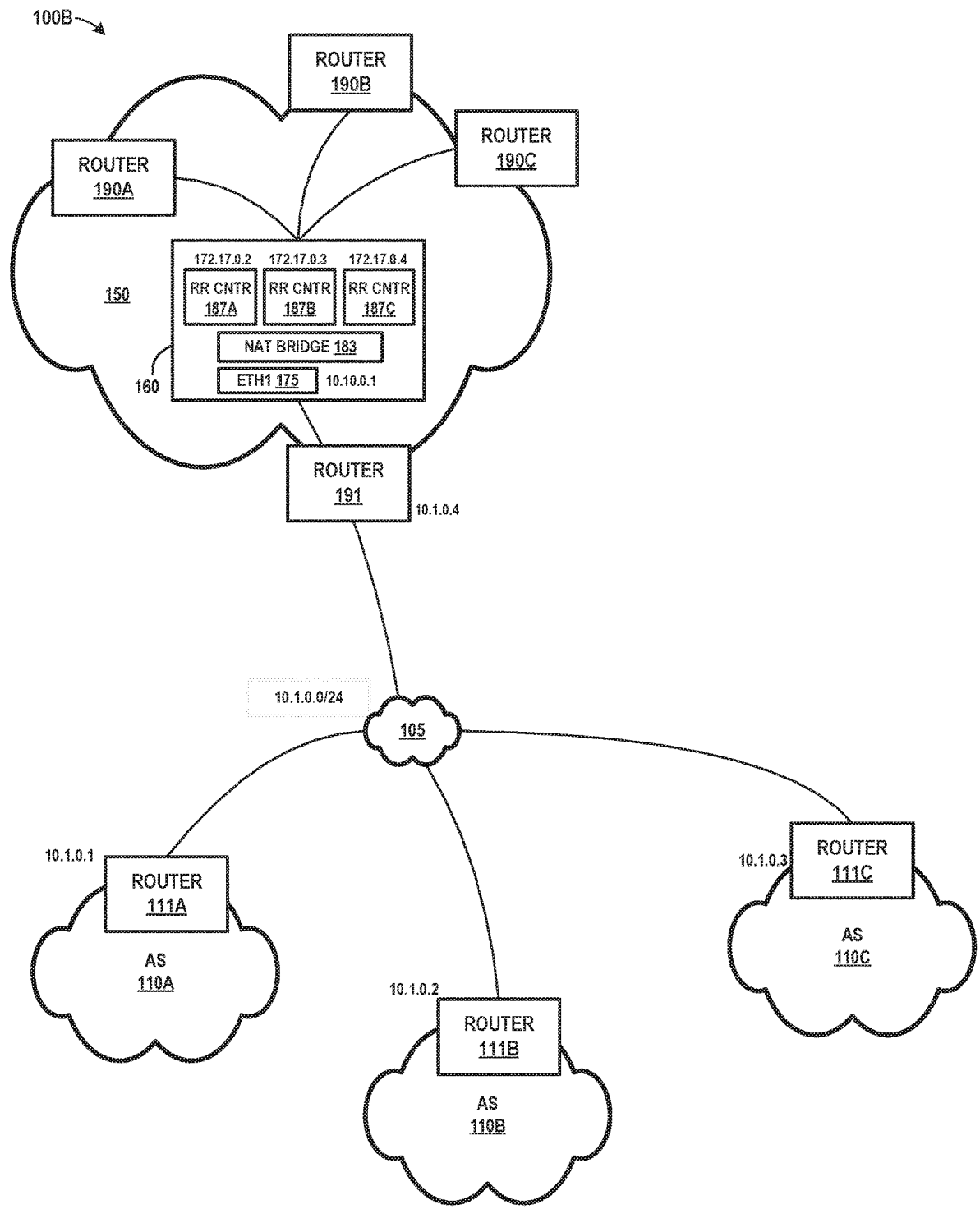
FIG. 1B is a block diagram illustrating an example system in which a route reflector is configured to share routing information with a plurality of devices within a network.

FIG. 1B is a block diagram illustrating an example system in which a routing protocol service system is configured as a route reflector to share routing information with a plurality of devices within a network. In FIG. 1B, system 100B includes network 150 and autonomous systems 110. Like FIG. 1A, FIG. 1B includes network 105 connecting network 150 with autonomous systems 110. FIG. 1B is similar to FIG. 1A, and in general, devices, systems, and/or components of FIG. 1B may correspond to like-numbered devices, systems, and/or components of FIG. 1A. In FIG. 1B, however, network 150 includes a routing route reflector 160 (i.e., a routing protocol service system) and router 191. Route reflector 160 includes ethernet interface 175, NATed bridge 183, and route reflector containers 187A, 187B, and 187C (collectively "route reflector containers 187," representing any number of route reflector containers). Route reflector 160 in FIG. 1B may operate in a manner similar to route server 170 of FIG. 1A, except that each of route reflector containers 187 included within route reflector 160 may implement route reflector functionality.

In FIG. 1B, route reflector 160 operates by executing one or more route reflector containers 187 to collectively implement route reflector functionality serving routers 190 and autonomous systems 110. Route reflector 160 acts as a filter and reflector for routers 190 within network 150. Border routers 111 may peer with router 191 over network 105, and as a result, router 191 may receive route information from one or more of border routers 111. Router 191 communicates such information to route reflector 160, which may filter and reflect such information to one or more of routers 190 within network 150. In some examples, some route reflector containers 187 within route reflector 160 may be assigned to a subset of routers 190 and other route reflector containers 187 may be assigned to a different subset of routers 190. In one such example, route reflector container 187A may serve as a route reflector for router 190A, and route reflector container 187B may serve as a route reflector for router 190B. Route reflector container 187A may receive routing information from one or more of border routers 111 (via router 191), and route reflector container 187A may determine that some of the routing information should be forwarded to router 190A, whereas other routing information may be discarded, since it is not relevant to router 190A. Similarly, route reflector container 187B may receive routing information from one or more of border routers 111 (via router 191), and route reflector container 187B may choose to pass some of the routing information along to router 190B while discarding other routing information.

In accordance with one or more aspects of the present disclosure, route reflector containers 187 may collectively implement a route reflector. For instance, in an example that can be described in the context of FIG. 1B, route reflector 160 instantiates each of route reflector containers 187 and each independently executes functionality similar to or corresponding to functionality of a route reflector in a BGP environment. Router 191 may peer with each of border routers 111, and communicate routing information received from border routers 111 to route reflector 160. Each of route reflector containers 187 within route reflector 160 may reflect that routing information to one or more of routers 190. Similarly, each of routers 190 may communicate routing information to route reflector containers 187, and each of route reflector containers 187 may communicate such routing information to router 191. When router 191 peers with each of border routers 111, that routing information originally from routers 190 is shared with each of border routers 111.

In a manner similar to that described in connection with FIG. 1A, to scale route reflector 160, route reflector 160 may instantiate one or more new route reflector containers 187. When a new autonomous system is added to system 100B, for example, route reflector 160 may instantiate a new route reflector container 187 to perform BGP sessions with the new autonomous system. Similarly, route reflector 160 may load balance among route reflector containers 187. For example, if border router 111A within autonomous system 110A is communicating a significant amount of routes during BGP peering sessions, route reflector 160 may reallocate which route reflector containers 187 peer with which border routers 111, and may alternatively, or in addition, instantiate one or more new route reflector containers 187.

The techniques described herein may provide certain technical advantages. For instance, by implementing route server 170 and route reflector 160 through multiple containerized routing protocol modules or routing protocol daemons, route server 170 and/or route reflector 160 may more effectively utilize processing resources (e.g., processing cores) within route server 170 and route reflector 160. Similarly, by implementing route server 170 and route reflector 160 using containerized routing protocol modules, scaling route server 170 and route reflector 160 can be performed by instantiating a new containerized routing protocol module. All of the containerized routing protocol modules can concurrently execute on a different cores of a multi-core compute node 270. In some examples, newly instantiated containers will be located behind NATed bridge 183, so such containers can also use the existing public address already used by border routers 111 when peering with route server 170 (and router 191/route reflector 160). Scaling in such a manner might not require any changes to peering protocols (e.g., BGP) and might not require any changes to BGP clients (e.g., border routers 111). Use of NATed bridge 183 may also provide security benefits, since communications with route server containers 185 and route reflector containers 187 might be difficult to initiate from outside network 150.

In some examples, the NATed bridge 183 may provide protection from denial-of-service attacks, since no incoming TCP synchronize message (i.e. "SYN" message) would reach the containerized cluster-nodes, without the cluster nodes themselves first initiating the TCP-connection outbound. And further, in some examples, route server 170 may have full control to decide which containerized cluster-nodes to load-balance/provision the BGP-clients on. Such an implementation also lends itself to rolling updates of individual cluster-nodes, enhancing high-availability and resiliency of the Route Reflector/Route Server-service in the network because having one node or routing protocol module down does not take down the whole cloud and/or cluster of containerized routing protocol modules. The clients that were being served by a routing protocol module that is down can be re-configured on a new node or routing protocol module.

Figure 2:
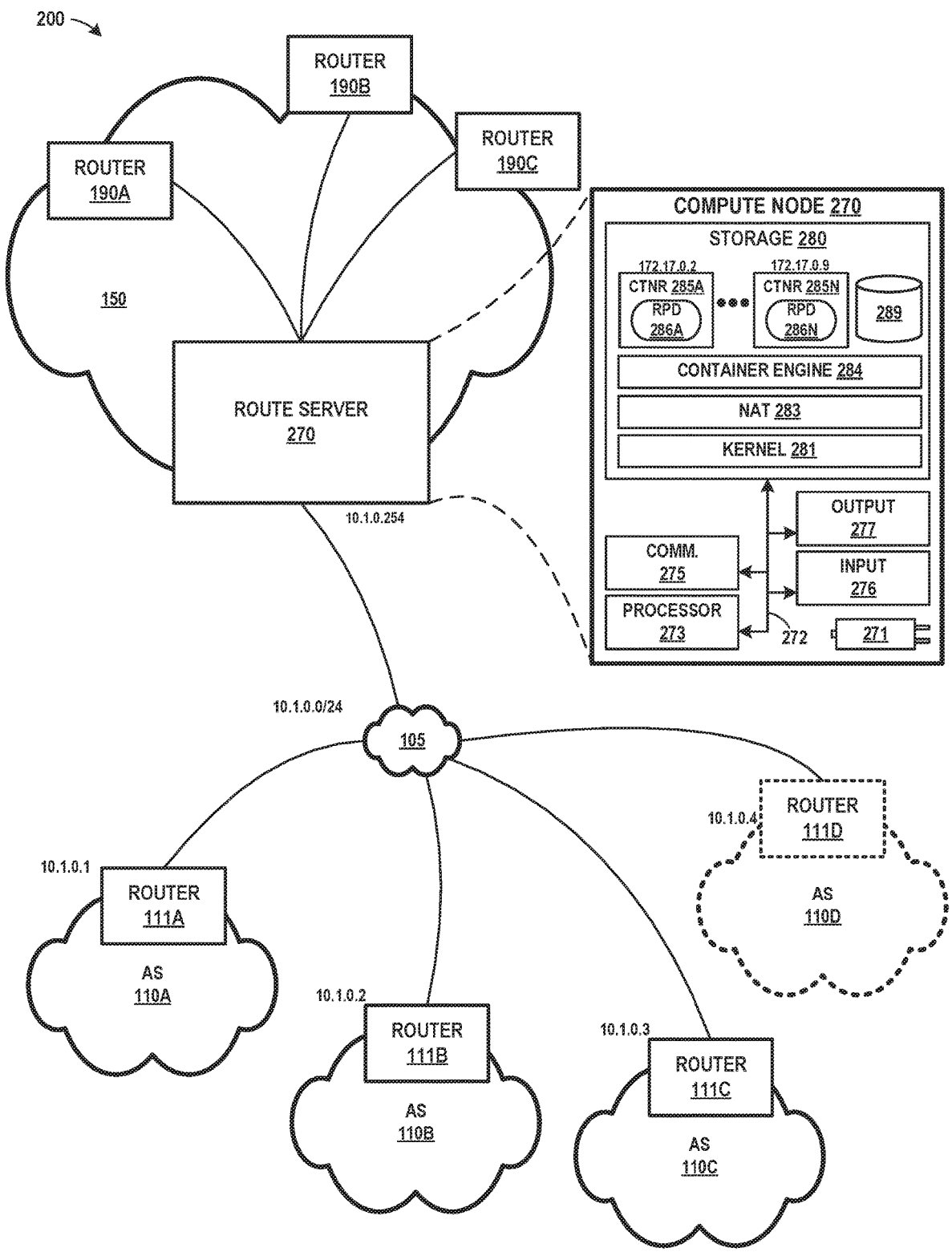
FIG. 2 is a block diagram illustrating an example system for scaling a routing service system using containerized routing protocol modules, in accordance with one or more aspects of the present disclosure

FIG. 2 is a block diagram illustrating an example system 200 for scaling a routing service system using containerized routing protocol modules, in accordance with one or more aspects of the present disclosure. System 200 of FIG. 2 may be described as an example or alternative implementation of system 100A of FIG. 1A. One or more aspects of FIG. 2 may be described herein within the context of FIG. 1A. In the example of FIG. 2, system 200 includes network 105 connecting network 150 and autonomous systems 110. System 200 of FIG. 2 includes many of the same devices, systems, and/or components of FIG. 1A, and in general, such devices, systems, and/or components of FIG. 2 may correspond to like-numbered devices, systems, and/or components of FIG. 1A. FIG. 2 also includes autonomous system 110D, which might not initially be part of system 200 and network 105, but may be added to network 105 during operation, as further described below.

In the example of FIG. 2, system 200 also includes compute node 270, which may be an example or alternative implementation of route server 170 of FIG. 1A. In the example illustrated in FIG. 2, compute node 270 includes underlying physical compute hardware that includes power source 271, one or more processors 273, one or more communication units 275, one or more input devices 276, one or more output devices 277, and one or more storage devices 280. One or more of the devices, modules, storage areas, or other components of host 270 may be interconnected to enable inter-component communications (physically, communicatively, and/or operatively). In some examples, such connectivity may be provided by through communication channels (e.g., communication channel 272), a system bus, a network connection, an inter-process communication data structure, or any other method for communicating data.

Power source 271 may provide power to one or more components of compute node 270. Power source 271 may receive power from the primary alternating current (AC) power supply in a building, residence, or other location. In other examples, power source 271 may be a battery or a device that supplies direct current (DC). In still further examples, compute node 270 and/or power source 271 may receive power from another source. One or more of the devices or components illustrated within compute node 270 may be connected to power source 271, and/or may receive power from power source 271. Power source 271 may have intelligent power management or consumption capabilities, and such features may be controlled, accessed, or adjusted by one or more modules of compute node 270 and/or by one or more processors 273 to intelligently consume, allocate, supply, or otherwise manage power.

One or more processors 273 of compute node 270 may implement functionality and/or execute instructions associated with compute node 270 or associated with one or more modules illustrated herein and/or described below. One or more processors 273 may be, may be part of, and/or may include processing circuitry that performs operations in accordance with one or more aspects of the present disclosure. Examples of processors 273 include microprocessors, application processors, display controllers, auxiliary processors, one or more sensor hubs, and any other hardware configured to function as a processor, a processing unit, or a processing device. Central monitoring system 210 may use one or more processors 273 to perform operations in accordance with one or more aspects of the present disclosure using software, hardware, firmware, or a mixture of hardware, software, and firmware residing in and/or executing at compute node 270.

One or more communication units 275 of compute node 270 may communicate with devices external to compute node 270 by transmitting and/or receiving data, and may operate, in some respects, as both an input device and an output device. Communication unit 275 may include or correspond to ethernet interface 175 of FIG. 1A, and may include some or all of components and/or hardware to implement NATed bridge 183 of FIG. 1A. In some examples, communication unit 275 may communicate with other devices over a network. In other examples, communication units 275 may send and/or receive radio signals on a radio network such as a cellular radio network. In other examples, communication units 275 of compute node 270 may transmit and/or receive satellite signals on a satellite network such as a Global Positioning System (GPS) network. Examples of communication units 275 include a network interface card (e.g. such as an Ethernet card), an optical transceiver, a radio frequency transceiver, a GPS receiver, or any other type of device that can send and/or receive information. Other examples of communication units 275 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 276 may represent any input devices of compute node 270 not otherwise separately described herein. One or more input devices 276 may generate, receive, and/or process input from any type of device capable of detecting input from a human or machine. For example, one or more input devices 276 may generate, receive, and/or process input in the form of electrical, physical, audio, image, and/or visual input (e.g., peripheral device, keyboard, microphone, camera).

One or more output devices 277 may represent any output devices of compute node 270 not otherwise separately described herein. One or more output devices 277 may generate, receive, and/or process output from any type of device capable of outputting information or signals (or anything else that can be characterized as output) to a human or machine. For example, one or more output devices 277 may generate, receive, and/or process output in the form of electrical and/or physical output (e.g., peripheral device, actuator).

One or more storage devices 280 within compute node 270 may store information for processing during operation of compute node 270. Storage devices 280 may store program instructions and/or data associated with one or more of the modules described in accordance with one or more aspects of this disclosure. One or more processors 273 and one or more storage devices 280 may provide an operating environment or platform for such modules, which may be implemented as software, but may in some examples include any combination of hardware, firmware, and software. One or more processors 273 may execute instructions and one or more storage devices 280 may store instructions and/or data of one or more modules. The combination of processors 273 and storage devices 280 may retrieve, store, and/or execute the instructions and/or data of one or more applications, modules, or software. Processors 273 and/or storage devices 280 may also be operably coupled to one or more other software and/or hardware components, including, but not limited to, one or more of the components of compute node 270 and/or one or more devices or systems illustrated as being connected to compute node 270.

In some examples, one or more storage devices 280 are temporary memories, which may mean that a primary purpose of the one or more storage devices is not long-term storage. Storage devices 280 of compute node 270 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 280, in some examples, also include one or more computer-readable storage media. Storage devices 280 may be configured to store larger amounts of information than volatile memory. Storage devices 280 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Kernel 281 may be a software and/or firmware layer that supports or provides access to a computing device's functions, such as scheduling tasks, execution tasks, and component and/or peripheral control. Kernel 281 may execute within the execution environment provided by storage devices 280 and processors 273. Kernel 281 may provide an operating environment, services, and control for one or more modules executing on host 270.

NAT module 283 may perform functions relating to remapping one address space into another by modifying network address information in a header of a network data unit packet. In the context of an IP network, for example, network address translation remaps one IP address space into another by modifying the network address information int eh IP header of IP packets while they are in transit on a network. NAT module 283 may translate private addresses used by containers 285 into a common public address visible to devices on network 105. Devices on network 105 (e.g., border routers 111) may communicate with specific RPD modules 286 by using the common public address, and NAT module 283 translates the public address into the private address used by a specific one of containers 285 on network 150 through network translation. Although NAT module 283 may be described in connection with FIG. 2 as primarily performing address translation operations, NAT module 283 may alternatively, or in addition, perform other operations, including those that provide some level of security for containers executing on compute node 270 or devices within network 150. Functions performed by NAT module 283 could be performed by a hardware device or one implemented primarily or partially through hardware.

Container engine 284 may serve as a management and orchestration system for containers 286 that execute within the operating environment provided by kernel 281 and/or the combination of storage devices 280 and processors 273. In some examples, container engine 284 may perform various organizational and maintenance tasks, including organizing one or more containers 286 into logical groups of related containers. Although normally a software module that executes on top of kernel 281 or an operating system, container engine 284 may, in some examples, be integrated into kernel 281 and may be implemented at least partially through firmware.

One or more containers 285 may represent a stand-alone, executable package of computing instructions. In some examples, each of containers 285 include code, runtime objects, system tools, system libraries, and/or settings needed to properly execute. In other examples, some components (e.g., runtime objects, libraries) may be provided by container engine 284 and/or kernel 281. Further, in some examples, each of containers 285 may be isolated from other containers 285 executing on host 270. Like a virtual machine, each of containers 285 is virtualized and may remain isolated from the host machine and other containers.

However, unlike a virtual machine, each container may omit an individual operating system and provide only an application suite and application-specific libraries. Each of containers 285 may be executed by host 270 as an isolated user-space instance and may share an operating system and common libraries with other containers executing on the host machine. As used herein, containers 285 may also be referred to as virtualization engines, virtual private servers, silos, or jails. In some examples, the techniques described herein with respect to containers may be applied to virtual machines or other virtualization components. In some examples, containers are managed by kernel 281 to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems.

RPD modules 286 may each implement routing protocol stack functionality as an application or daemon executing on one of containers 285. In some examples, each of RPD modules 286 may implement route server functionality, enabling, for example, route server 170 of FIG. 1A to be scaled out to accommodate additional routing traffic and/or additional routing peers over network 105. In other examples, each of RPD modules 286 may alternatively or in addition implement route reflector functionality, enabling, for example, route reflector 160 of FIG. 1B to be scaled out to accommodate additional routing traffic and/or additional routing peers over network 105. RPD modules 286 may be implemented by commercially-available containerized routing protocol daemon software, such as the cRPD (containerized routing protocol daemon) available from Juniper Networks of Sunnyvale, Calif.

In some examples, each of RPD modules 286 may include its own RIB data store, and each such RPD module 286 may independently maintain its RIB data store. In other examples, each of RPD modules 286 may share a data store (e.g., data store 289) that could replace RIB data stores within each of RPD modules 286. In such an example, each of RPD modules 286 may collectively maintain data store 289, operate from data stored within data store 289, and collectively learn routes as new routes are stored within data store 289.

Data store 289 may represent any suitable data structure or storage medium for storing routing information, routes, and/or information learned from BGP protocol sessions. Data store 289 may be maintained collectively by RPD modules 286. In some examples, particularly where data store 289 represents a data store shared by each of RPD modules 286 to store routing information, data store 289 may enable RPD modules 286 to avoid peering with each other. In such an example, if RPD modules 286 maintain data store 289 collectively, routes stored within data store 289 by one RPD module 286 are accessible, and thus learned by each of the other RPD modules 286. Accordingly, any route learned by one of RPD modules 286 may be considered to be learned at the same time by each of the other RPD modules 286. The information stored in data store 289 may be searchable and/or categorized such that one or more of RPD modules 286 may provide an input requesting information from data store 289, and in response to the input, receive information stored within data store 289.

In accordance with one or more aspects of the present disclosure, compute node 270 may instantiate one or more RPD modules 286. For instance, in an example that can be described in the context of FIG. 2, communication unit 275 of compute node 270 detects signal over network 105 and outputs an indication of the signal to container engine 284. Container engine 284 determines that the signal corresponds to a command to create one or more RPD modules 286, each executing within one of containers 285. Container engine 284 instantiates container 285A through container 285N. Container engine 284 configures each of containers 285 to execute RPD modules 286. In some examples, compute node 270 may receive the original signal that is interpreted as a command to create one or more RPD modules 286 from an administrator and/or an authorized user or from another system.

Each of RPD modules 286 may peer with one or more of border routers 111. For instance, again in the example being described with reference to FIG. 2, container engine 284 configures each of RPD modules 286 to operate as an instance of a route server. Container engine 284 further configures each of RPD modules 286 to peer with one or more of border routers 111. In one example, container engine 284 configures RPD module 286A to peer with border router 111A and border router 111B, and configures another one of RPD modules 286 to peer with border router 111C. In such an example, RPD module 286A causes communication unit 275 to output a plurality of signals over network 105. Border router 111A detects a signal over network 105 and determines that the signal corresponds to a request to establish a BGP session. Border router 111A and RPD module 286A further communicate, establish a BGP session, and exchange routing information. Similarly, border router 111B detects a signal over network 105 and determines that the signal corresponds to a request to establish a BGP session. Border router 111B and RPD module 286A further communicate, establish a BGP session, and exchange routing information.

Still referring to the example being described with reference to FIG. 2, another RPD module, such as RPD module 286B (not specifically shown in FIG. 2) causes communication unit 275 to output a signal over network 105. Border router 111C detects a signal over network 105 and determines that the signal corresponds to a request to establish a BGP session. Border router 111C and RPD module 286B further communicate, establish a BGP session, and peer with each other to exchange routing information.

RPD module 286A may continue to peer with border router 111A and border router 111B. RPD module 286B may continue to peer with border router 111C. Such peering may continue to peer until compute node 270 reconfigures roles of containers 285 and/or RPD modules 286. For example, and as described below, compute node 270 may cause RPD module 286A to no longer peer with border router 111A and/or border router 111B, or may otherwise modify the peering relationships between RPD modules 286 and border routers 111.

Compute node 270 may perform network address translation for communications between RPD modules 286 and border routers 111. For instance, in the example described above where RPD module 286A peers with border router 111A, RPD module 286A causes signals to be output over network 105 when communicating with border router 111A. For example, when RPD module 286A causes a signal to be output over network 105 to establish a connection with border router 111A, NAT module 283 translates the address associated with RPD module 286A (e.g., 170.17.0.2) to the public address accessible to border router 111A (10.1.0.254). Border router 111A receives a signal over network 105 from a device having a source address of 170.17.0.2. Border router 111A sends responsive communications to the source device over network 105 to the public address used by RPD module 286A (10.1.0.254). Communication unit 275 detects responsive signals over network 105, and performs network address translation to translate the public address to the address used by RPD module 286A (170.17.0.2). In this example, since each of RPD modules 286 may be effectively behind a network translation bridge implemented by NAT module 283, devices outside of network 150 (e.g., border routers 111) might not be able to initiate communications with any of RPD modules 286 directly. In other words, BGP sessions might only be capable of being established in the outbound direction (i.e., from containerized RPD out to the BGP client device), since incoming connections may be precluded the NATed bridge. Accordingly, in such examples, when establishing BGP sessions, each of RPD modules 286 may need to first initiate the BGP session with each of border routers 111 that it seeks to peer with, since the NATed bridge may preclude any of border routers 111 from initiating a BGP session with RPD modules 286.

Compute node 270 may scale out in order to peer with a new autonomous system being added to system 200. For instance, continuing with the example being described, compute node 270 monitors network 105 by causing communication unit 275 to detect signals over network 105. Communication unit 275 detects a signal that container engine 284 determines indicates that autonomous system 110C has been added to network 105. Container engine 284 further determines that routing information should be exchanged with autonomous system 110C. Container engine 284 causes a new container 285N to be instantiated. Container engine 284 configures container 285N to execute RPD module 286N. RPD module 286N causes NAT module 283 to translate its address to a public address and cause communication unit 275 to output a signal over network 105 using the public address. Border router 111D detects a signal and communicates with RPD module 286N to establish a BGP session. To communicate with RPD module 286N, border router 111D uses the public address which is translated into a private address used by RPD module 286N. RPD module 286N and border router 111D thereafter peer to exchange routing information. In some examples, rather than instantiating container 285N and RPD module 286N, RPD module 286A and/or another one of RPD modules 286 may be configured to peer with new border router 111D. However, by instantiating container 285N and RPD module 286N, container engine 284 may more effectively scale resources available for performing routing protocol operations.

Compute node 270 may reassign one or more RPD modules 286 to balance the load on each of RPD modules 286. For instance, in the example of FIG. 2, container engine 284 may observe routing protocol sessions between RPD modules 286 and border routers 111 and determine that RPD module 286A is handling a high level of routing information traffic relative to other RPD modules 286. In such an example, container engine 284 causes RPD module 286A to no longer peer with border router 111B. Container engine 284 further causes RPD module 286N to begin peering with border router 111B, thereby reducing the load on RPD module 286A, and thereby altering the balance of BGP peering traffic handled by each of RPD modules 286. In some examples, by adjusting and/or rebalancing peering relationships between each of RPD modules 286 and border routers 111, RPD modules 286 may operate more efficiently and/or effectively.

Each of RPD modules 286 may peer with each other. For instance, in the example of FIG. 2, each of RPD modules 286 may need to be aware of routing information acquired by other RPD modules 286, so in order to acquire such information, each of RPD modules 286 may peer with each other. In such an example, container engine 284 may configure each of RPD modules 286 to establish internal BGP sessions with each other one of RPD modules 286 in a full mesh arrangement. So in an example with exactly three RPD modules 286 (i.e., RPD module 286A, RPD module 286B, and RPD module 286C), RPD module 286A peers with both RPD module 286B and RPD module 286C, RPD module 286B peers with RPD module 286A and RPD module 286C, and RPD module 286C peers with RPD module 286A and RPD module 286B. To peer within compute node 270, such communication may be facilitated by container engine 284 and/or kernel 281. In some examples, peering between RPD modules 286 that are executing on the same compute node 270 might be more efficient than implementations where one or more routing protocol modules are executing across multiple computing devices and peer over a network (e.g., network 150). Where RPD modules 286 are instantiated across multiple compute nodes 270, however, peering between RPD modules 286 may involve communications over network 150.

Each of RPD modules 286 may peer with other RPD modules 286 that are handling the same address family. In some examples, container engine 284 may, to the extent possible, configure each of RPD modules 286 to peer with border routers 111 such that each of RPD modules 286 processes routing information or routes for a different address family or a different set of address families. As one example, RPD module 286A may process routing information for address families A and B, while RPD module 286B may process routing information for address families C and D. In such an example, if address families A and B do not overlap with address families C or D, then RPD module 286A might not need to peer with RPD module 286B, thereby reducing operations that need to be performed by the collective set of RPD modules 286. However, if such address families do overlap, or if RPD module 286B is also configured to process one or more of the address families being processed by RPD module 286A, then RPD module 286A and RPD module 286B may need to peer, as described above. In such an example, however, RPD module 286A and RPD module 286B might only need to peer for those address families RPD module 286A and RPD module 286B have in common.

In addition to peering among RPD modules 286, one or more of RPD modules 286 may take other actions to share routes with other RPD modules 286 to ensure that no paths are being hidden from any other RPD module. In some examples, each of RPD modules 286 might peer with only a subset of border routers 111. In such an example, RPD modules 286 may peer with each other to share routes that each is learning from its subset of border routers 111. However, in some examples, BGP may, when advertising routes, advertise only the best path to a destination. In such a situation, therefore, RPD modules 286 might not be sharing all of its routing information with the other RPD modules 286. To avoid hidden paths, therefore, one or more of RPD modules 286 might not only peer with each other, but also negotiate add-path to help ensure better visibility of route information across RPD modules 286 and to avoid hidden paths.

RPD modules 286 may share routing information stored in a common data store 289. For instance, in an example that can be described in connection with FIG. 2, container engine 284 configures each of RPD modules 286 to peer with one or more of border routers 111. For example, RPD module 286A may be configured to peer with border router 111A, and RPD module 286N may be configured to peer with border router 111D. While peering with border router 111A, RPD module 286A may learn a first set of routes and cause container engine 284 to store the first set of routes in data store 289. While peering with border router 111D, RPD module 286N may learn a second set of routes, and cause container engine 284 to store the second set of routes in data store 289. Thereafter, when identifying possible routes, RPD module 286A accesses data store 289 and therefore has access to routes that both RPD module 286A and RPD module 286N (and any other RPD module 286) have previously stored within data store 289. Similarly, when RPD module 286N seeks to identify routes, RPD module 286N has access to routes that any other RPD module 286 has stored within data store 289. Accordingly, in such an example, it may be possible for RPD modules 286 to avoid peering with each other and avoid storing routes in separate RIBs included within each of RPD modules 286. In the example described, rather than a RIB included within each of RPD modules 286, data store 289 may serve as a common routing information data store that each of RPD modules 286 can operate from, thereby avoiding peering and storing multiple copies of the same information. Each of RPD modules 286 may access data store 289 through an API or a publish/subscribe model.

FIG. 2 is described in the context of compute node 270 implementing route server 170 of FIG. 1A. In other examples, compute node 270 may alternatively, or in addition, implement route reflector 160 of FIG. 1B. In such an example, each of RPD modules 286 may act as a separate route reflector and may be configured to perform operations similar to that performed by route reflector containers 187. In such an example, compute node 270 may scale route reflector operations by instantiating new RPD modules 286 and/or reallocating border routers 111 assigned to each of RPD modules 286.

Modules illustrated in FIG. 2 (e.g., kernel 281, NAT module 283, container engine 284, RPD modules 286) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
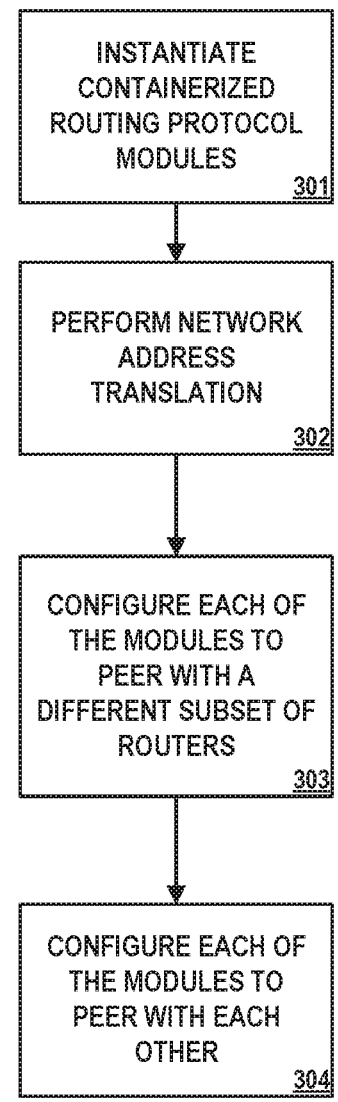
FIG. 3 is a flow diagram illustrating operations performed by an example compute node in accordance with one or more aspects of the present disclosure.

FIG. 3 is a flow diagram illustrating operations performed by an example compute node in accordance with one or more aspects of the present disclosure. FIG. 3 is described herein within the context of compute node 270 of FIG. 2. In other examples, operations described in FIG. 3 may be performed by one or more other components, modules, systems, or devices. Further, in other examples, operations described in connection with FIG. 3 may be merged, performed in a difference sequence, omitted, or may encompass additional operations not specifically illustrated or described.

In the example of FIG. 3, and in accordance with one or more aspects of the present disclosure, compute node 270 may instantiate containerized routing protocol modules (301). For instance, in some examples, communication unit 275 of compute node 270 may detect a signal over network 105 that originates from a computing device (not shown) operated by an administrator. Container engine 284 interprets the signal as a command to create one or more RPD modules 286, each executing within one of containers 285. Container engine 284 instantiates container 285A through container 285N, and configures each of containers 285 to execute RPD modules 286. Container engine 284 may further configure each of RPD modules 286 to independently perform route server functionality.

Compute node 270 may perform network address translation (302). For instance, in some examples, compute node 270 may configure NAT module 283 to enable each of RPD modules 286 to communicate with devices on network 105 using a common public address (e.g., 10.1.0.254). To do so, NAT module 283 may translate the source address included within network data packets that each of RPD modules 286 cause communication unit 275 to output over network 105 into the common public address. Similarly, NAT module 283 may receive network data packets over network 105 that are destined for each of containers 285, and translate the public destination address into the appropriate address associated with each of containers 285.

Compute node 270 may configure each of RPD modules 286 to peer with a different subset of autonomous systems 110 (303). For instance, in some examples, container engine 284 configures each of RPD modules 286 to operate as an instance of a route server. Container engine 284 further configures each of RPD modules 286 to peer with one or more of border routers 111. Thereafter, each of RPD modules 286 periodically and/or occasionally peer with one or more of border routers 111 and exchange routing information. In one example, container engine 284 causes RPD module 286A to peer with border router 111A and border router 111B. In such an example, RPD module 286A causes communication unit 275 to output a plurality of signals over network 105. Border router 111A detects a signal over network 105 and determines that the signal corresponds to a request to establish a BGP session. Border router 111A and RPD module 286A further communicate, establish a BGP session, and exchange routing information.

Compute node 270 may configure each of RPD modules 286 to peer with each other (304). For instance, in some examples, each of RPD modules 286 may share routing information by engaging in a BGP peering session. In such an example, container engine 284 may configure each of RPD modules 286 to establish BGP sessions with each other one of RPD modules 286 in a full mesh arrangement. To peer within compute node 270, such communication may be facilitated by container engine 284 and/or kernel 281. Where RPD modules 286 are instantiated across multiple compute nodes 270, peering between RPD modules 286 may involve communications over network 150.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., data sources 210, client devices 220, computing systems 240, administrator devices 290, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1A, FIG. 1B, and/or FIG. 2) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
   instantiating, by a computing system, a plurality of containerized routing protocol modules, each capable of storing routing information about a network having a plurality of routers;
   performing, by the computing system, network address translation to enable each of the containerized routing protocol modules to communicate with any of the plurality of routers using a public address associated with the computing system;
   configuring, by the computing system, each of the containerized routing protocol modules to use the public address to peer with a different subset of the plurality of routers so that each of the containerized routing protocol modules share routing information with a different subset of the plurality of routers; and
   configuring, by the computing system, each of the containerized routing protocol modules to peer with each other to share routing information received from the different subsets of the plurality of routers.

2. The method of claim 1, further comprising:
   instantiating, by the computing system, a new containerized routing protocol module that is capable of storing routing information about the network; and
   configuring, by the computing system, the new containerized routing module to use the public address to peer with a subset of the plurality of routers.

3. The method of claim 2, wherein instantiating the new containerized routing protocol is responsive to at least one of:
   detecting, by the computing system, increased activity associated with sharing routing information, or
   detecting, by the computing system, an indication of user input.

4. The method of claim 1, further comprising:
   reconfiguring, by the computing system, each of the containerized routing protocol modules to use the public address to peer with a new subset of the plurality of routers.

5. The method of claim 4, wherein reconfiguring each of the containerized routing protocol is responsive to at least one of:
   detecting, by the computing system, increased activity associated with sharing routing information, or
   detecting, by the computing system, an indication of user input.

6. The method of claim 1, wherein configuring each of the containerized routing protocol modules to use the public address to peer with the different subset of the plurality of routers includes:
   configuring each containerized routing protocol module of the containerized routing protocol modules to peer with routers processing routing information associated with a common address family for the containerized routing protocol module.

7. The method of claim 6, wherein configuring each of the containerized routing protocol modules to peer with each other to share routing information includes:
   configuring each of the containerized routing protocol modules to peer with only other containerized routing protocol modules configured to process routing information associated with the same address family.

8. The method of claim 1, wherein configuring each of the containerized routing protocol modules to peer with each other to share routing information includes:
   configuring each of the containerized routing protocol modules to store routing information in a routing information data store included within the containerized routing protocol module.

9. The method of claim 1, wherein configuring each of the containerized routing protocol modules to peer with each other to share routing information includes:
   configuring each of the containerized routing protocol modules to store routing information in a shared routing information data store accessible to each of the containerized routing protocol modules.

10. The method of claim 1, wherein the computing system comprises a plurality of compute nodes in a data center.

11. The method of claim 1, wherein configuring each of the routing protocol modules to peer with each other to share routing information includes:
performing additional communications to send multiple client paths to peer cluster nodes.

12. The method of claim 11, wherein performing additional communications includes negotiating add path.

13. The method of claim 1, wherein each of the containerized routing protocol modules provides BGP route server functionality.

14. The method of claim 1, wherein each of the containerized routing protocol modules provides BGP route reflector functionality.

15. The method of claim 1, wherein each of the containerized routing protocol modules is implemented using at least one of:
a Linux containerization mechanism;
a Docker containerization mechanism;
a containerized routing protocol daemon; or
a containerized BGP module.

16. The method of claim 1,
wherein the computing system comprises a single compute node having a multi-core processor, and
wherein each of the containerized routing protocol modules concurrently executes on a different core of the multi-core processor.

17. The method of claim 16, wherein the public address is an external public network address of the single compute node.

18. A system comprising:
a storage system; and
processing circuitry having access to the storage system and configured to:
instantiate a plurality of containerized routing protocol modules, including a first module and a second module, each capable of storing routing information about a network having a plurality of routers;
perform network address translation to enable each of the first module and the second module to communicate with any of the plurality of routers using a public address associated with the computing system;
configure the first module to use the public address to peer with a first subset of the plurality of routers;
configure the second module to use the public address to peer with a second subset of the plurality of routers, wherein the second subset is different than the first subset;
configure the first module to peer with the second module to share routing information received from the first subset of the plurality of routers; and
configure the second module to peer with the first module to share routing information received from the second subset of the plurality of routers.

19. The system of claim 18, wherein the processing circuitry is further configured to:
instantiate, in response to increased demand, a third containerized routing protocol module that is capable of storing routing information about the network; and
configure the third containerized routing module to use the public address to peer with a third subset of the plurality of routers, wherein the third subset is different than the first subset, and wherein the third subset is different than the second subset.

20. A method comprising:
instantiating, by a computing system, a plurality of containerized routing protocol modules, each of the containerized routing protocol modules capable of storing routing information about a network having a plurality of routers;
performing, by the computing system, network address translation to enable each of the containerized routing protocol modules to communicate with any of the plurality of routers using a public address associated with the computing system; and
configuring, by the computing system, each of the containerized routing protocol modules to:
communicate, using the public address, with a subset of the plurality of routers to peer with the subset of the plurality of routers so that each of the plurality of containerized routing protocol modules share routing information with a different subset of the plurality of routers,
store routing information in a shared data store accessible to each of the containerized routing protocol modules, and
share, through the shared data store and with at least one other of the containerized routing protocol modules, routing information.

* * * * *